(No Model.)
W. J. REYNOLDS.
INSECT TRAP.
No. 263,222. Patented Aug. 22, 1882.
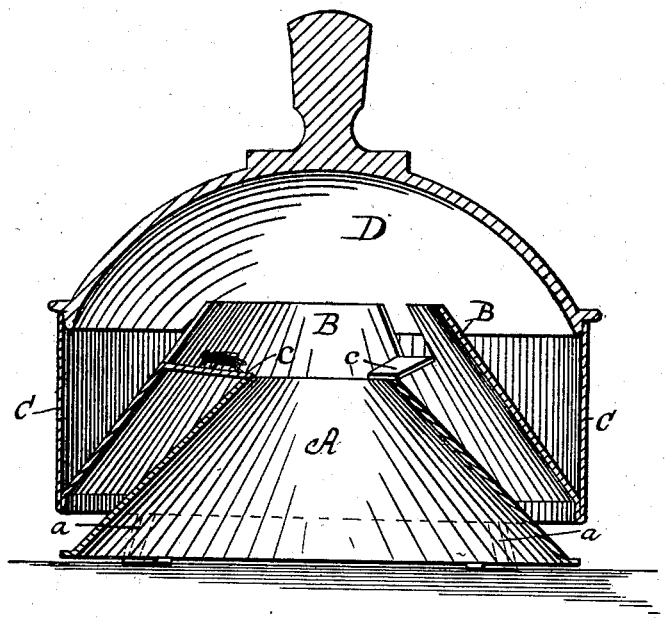
Witnesses:
Inventor:
W. J. Reynolds
By H. J. Ennis
Atty.

UNITED STATES PATENT OFFICE.

WILLIAM J. REYNOLDS, OF COLUMBIA, SOUTH CAROLINA.

INSECT-TRAP.

SPECIFICATION forming part of Letters Patent No. 263,222, dated August 22, 1882.

Application filed June 1, 1882. (No model.)

*To all whom it may concern:*

Be it known that I, WM. J. REYNOLDS, a citizen of the United States of America, residing at Columbia, in the county of Richland and State of South Carolina, have invented certain new and useful Improvements in Insect-Traps, of which the following is a specification, reference being had therein to the accompanying drawing.
My invention has relation to insect-traps for flies, ants, roaches, and the like; and the novelty consists in the construction of the same, as will be hereinafter more fully described, and particularly pointed out in the claim.
The figure in the drawing is a sectional elevation of my improved trap.

A is a hollow cone frustum resting on the ground. B is a similar cone mounted on legs $a$ $a$, so as to raise it a short distance above the cone A. C is a cylindrical band or drum secured to the base of the cone B, and extending upward, so as to form a support for the removable glass dome D.

The outside of the cone A may be covered with any suitable bait to attract the insects, and in the case of flies they pass between the cones and are attracted by the light into the dome portion, and eventually fall into the space between the cone B and the cylinder C, while in the case of creeping insects—such as ants, roaches, and the like—in crawling up the outside of the cone A they either fall into the interior of said cone or pass over the bridges $c$ into the interior of the band C. When the trap is full the glass cover may be lifted and the contents emptied.

Having thus described my invention, what I claim as new and useful, and desire to secure by Letters Patent of the United States, is—

An insect-trap consisting of the cone A, in combination with the cone B, having legs $a$ and bridges $c$, and provided with the cylindrical band C, having the glass dome D, substantially as and for the purposes set forth.

In testimony whereof I affix my signature in presence of two witnesses.

WILLIAM J. REYNOLDS.

Witnesses:
   E. H. BRADFORD,
   H. J. ENNIS.